(No Model.) 2 Sheets—Sheet 1.
N. B. SPRADLEY.
WHEELED AGRICULTURAL IMPLEMENT.
No. 406,963. Patented July 16, 1889.
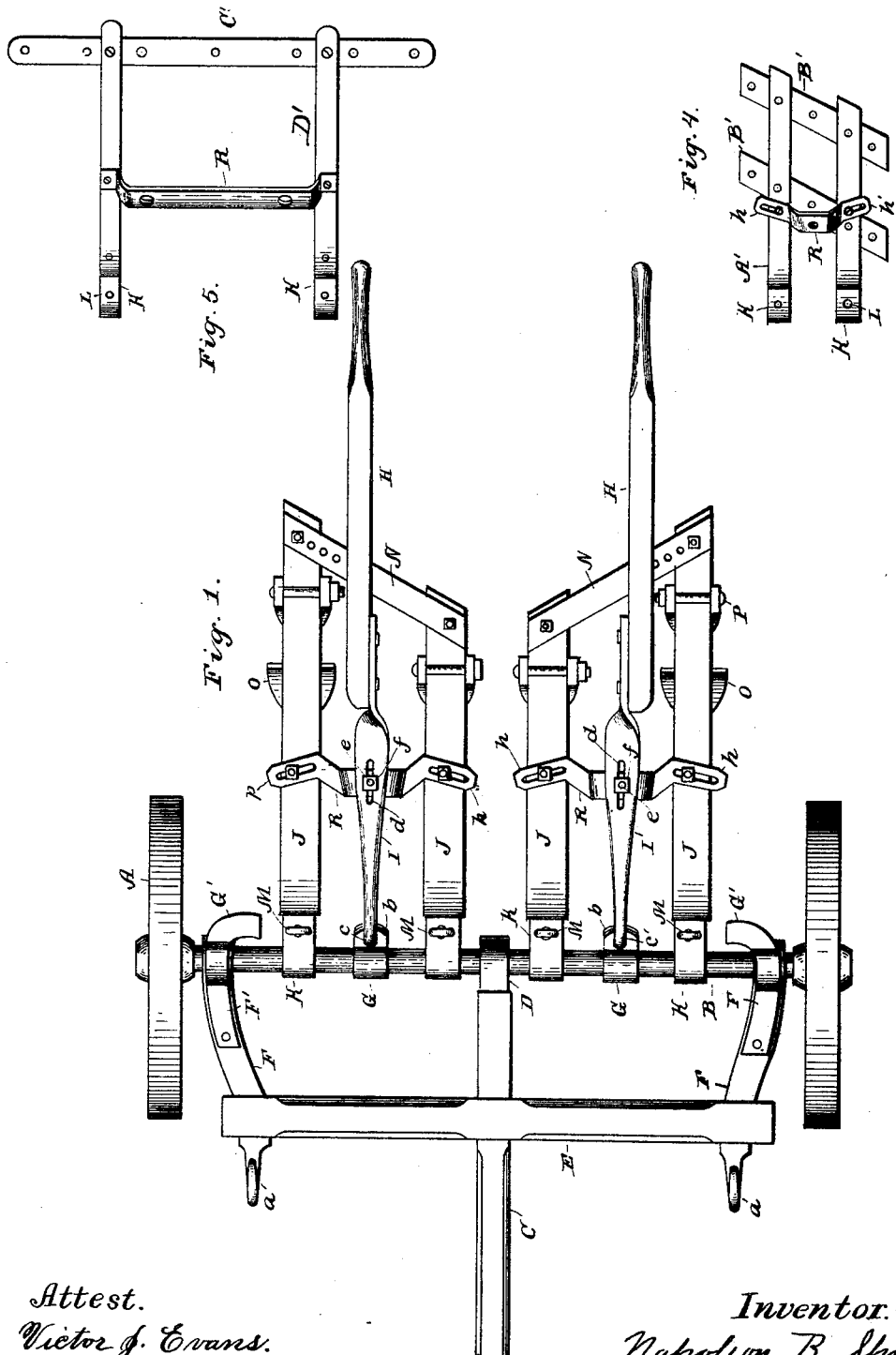
Attest.
Victor J. Evans.
A. L. Evans
Inventor.
Napoleon B. Spradley
by J. F. Beale Atty.

(No Model.) 2 Sheets—Sheet 2.
N. B. SPRADLEY.
WHEELED AGRICULTURAL IMPLEMENT.
No. 406,963. Patented July 16, 1889.
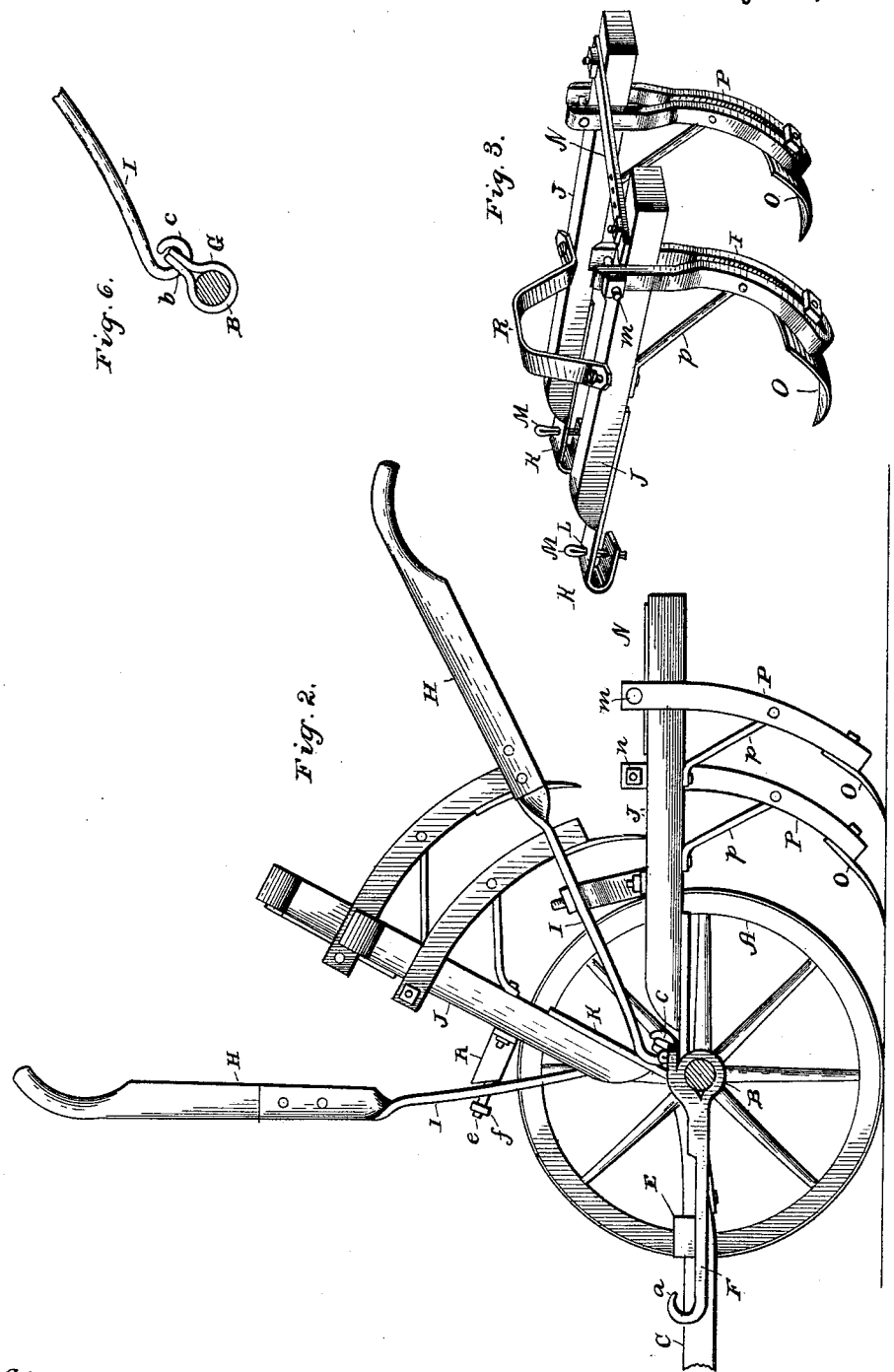
Attest.
Victor J. Evans.
A. L. Evans
Inventor.
Napoleon B. Spradley
by
J. F. Beale Atty

UNITED STATES PATENT OFFICE.

NAPOLEON B. SPRADLEY, OF ASHVILLE, ALABAMA.

WHEELED AGRICULTURAL IMPLEMENT.

SPECIFICATION forming part of Letters Patent No. 406,963, dated July 16, 1889.

Application filed May 2, 1889. Serial No. 309,339. (No model.)

*To all whom it may concern:*

Be it known that I, NAPOLEON B. SPRADLEY, a citizen of the United States, residing at Ashville, in the county of St. Clair and State of Alabama, have invented certain new and useful Improvements in Wheeled Agricultural Implements; and I do hereby declare the following to be a full, clear, and exact description of the invention, such as will enable others skilled in the art to which it appertains to make and use the same.

This invention relates to wheeled agricultural implements; and it has for its object to provide an agricultural implement of this class made up of independent sections, each of which sections may have a vertical and lateral movement imparted to it independently of the other section at the will of the operator, and also to provide a wheeled running-gear which is specially adapted for interchangeable use in the mounting thereon of different implements; and it consists of the parts and combinations of parts hereinafter described and claimed.

In the accompanying drawings, forming a part of this specification, Figure 1 is a plan view of my improved machine; Fig. 2, a side elevation of the same with one wheel removed; Fig. 3, a perspective detail view of one of the cultivator-frames; Fig. 4, a plan view of a sectional harrow; Fig. 5, a plan view of a hay-rake adapted to be used in connection with my invention, and Fig. 6 a detail view.

Similar letters refer to similar parts throughout the several views.

A represents the wheels of my improved implement, which may be of any desired or suitable construction, which are mounted loosely on the axle B. A tongue C is rigidly secured to the center of the axle by means of a shaft-iron D, which embraces the axle. A cross-bar E is also secured to the tongue in front of the axle, each end of which is rigidly secured to tug-irons F, having hooks *a*, which are also rigidly fastened to the axle in any desired manner. At suitable distances apart, preferably midway between the shaft-iron D and the wheels A, perforated lugs are rigidly secured to the axle. These lugs may be formed in the shape of collars G, having perforated lugs *b* projecting therefrom, as shown, or the lugs may be secured to the axle in any other desired manner. The lugs should project from the axle at right angles and also at an obtuse angle to a vertical line, as shown in Fig. 1.

H represents the handles, there being one for each section of implement employed, to one end of each of which is secured a slotted bar I, the end of which is tapered off and linked, as at *c*, in the perforated lug *b*, so as to be easily turned or moved therein, as best shown in Fig. 6. The slot *d* in said bar extends in the direction of the length of the bar, and through this slot, by means of a screw-bolt *e* and nut *f*, the handle is secured to the desired agricultural implement, as will be described.

In Figs. 1 and 2 I show a sectional cultivator connected to the axle and handles, in which J represents beams of unequal length having the half-clips K secured to their front ends in any desired manner, through which perforations L are formed to receive a split key M in order to secure said clips to the axle which they embrace. The clips embrace the axle loosely and may be moved laterally along the same or be turned thereon. At the rear the beams J are connected by means of a flat bar N, which is rigidly bolted or secured thereto, and which is provided with a suitable number of perforations at one end, whereby the beams may be adjusted toward or from each other, as desired, in order to decrease or increase the distance between the shovel-plows O, secured to the lower ends of the stocks P.

At about the center of the beams J a saddle R is adjustably secured, to which the handles are loosely secured by the bolt *e* and nut *f*, hereinbefore mentioned, said bolt passing through a perforation in the saddle and the slot *d* in the bar I at the handle. As clearly shown in Fig. 1, the saddle is formed of a single piece of flat metal bent U-shaped and having slotted feet *h*, which rest on the beams and are there held by screw-bolts and nuts passing through the slots and beams. It will be observed that by this construction the beams may be easily adjusted toward or from each other and held rigidly in their adjusted positions by means of the saddles and the bars N, it only being necessary to loosen the nuts to adjust the beams in the slots of the feet of the saddle and to remove the bolts to another perforation in the bars N.

The plow-stocks P are shown as formed of a single flat bar of steel bent at its center so as to bring the halves parallel with each other, but leaving a space between them, and curving forward. The upper ends of the stock are bent outwardly from each other in order to receive the beam J between them, and a bolt $m$, passing through perforations in the ends of the stock, with a nut $n$ on one end above the beam, secures the stock to said beam. A brace-rod $p$, bolted to the stock and to the under side of the beam, holds the stock rigidly in place. The plows O are each provided with a short bar having a head thereon which is fitted in the space between the halves of the stock and there clamped; or the bars may be screw-threaded and a nut run on the same to hold it rigidly in position, as shown in Fig. 3.

To the tug-irons F, at each side of the machine, a bar F' is rigidly secured, one end of which is bent inwardly to form a locking-support G', by which the sections of the implement that may be in use is supported in going to and returning from the field. In Fig. 4 I show one section of a harrow, consisting of beams A' of unequal length, to which are secured the teeth-bars B', said bars being secured to said beams at acute angles, so as to cause the teeth of each bar to break joint with each other. These beams are provided with half-clips K and saddle R, the same as the cultivator.

In Fig. 5 I show a hay-rake, the teeth of which being secured in a cross-bar C' and the beams D' being connected by a saddle R, and having the half-clips K, similar to those already described, excepting that the saddle is greatly enlarged and provided with two perforations, and that the rake is not formed in sections, although it will be operated by two handles, as in the case of the other implements.

In operation the sections can be thrown or moved to the right or left by means of the handles H, in order to escape stumps or roots of trees and other obstructions which might injure the implement, by simply moving said handles to one side or the other, the ends of the handles working as on a pivot in the lugs $b$, the slots permitting of its sliding back and forth on the bolts $e$. By raising the handles and moving them toward the wheels the sections may be raised and the beams caught over the locking-supports G', which will thus support the sections in going to and returning from the field.

Thus it will be seen that the one running-gear and handles will answer for a variety of agricultural implements, any of which may be easily and readily secured thereto and adjusted thereon.

Having thus described my invention, what I claim as new, and desire to secure by Letters Patent, is—

1. The combination of the axle, the wheels, the perforated lugs rigidly secured to said axle, the agricultural implement loosely secured to said axle, the saddle secured to said implement, the slotted handles loosely attached to said saddle and having their ends pivoted in said lugs, and the supports rigidly secured to said axle, substantially as described.

2. The combination, in a wheeled agricultural implement, of the beams J, having the half-clips adjustably secured to the axle, the saddles adjustably secured to said beams, the handles pivotally secured to said axle and adjustably secured to said saddles, and the supports rigidly secured to the axle, whereby a cultivator, a harrow, or a rake may be attached to said axle and a vertical and lateral movement imparted thereto, substantially as described.

3. A wheeled frame adapted to carry various agricultural implements, in combination with the tug-irons, the bars F', extended to form beam-supports in the rear of the axle, the collars having perforated lugs projecting therefrom, and the agricultural implement adjustably attached to said axle, and perforated lugs, whereby said implement may be moved laterally and vertically, substantially as described.

4. The combination, in a wheeled agricultural implement, with the axle having the perforated lugs projecting therefrom, the handles loosely secured to said lugs, and the supports fixed to said axle, of the beams having the perforated half-clips movable on the axle, the adjustable perforated bar connecting said beams, and the adjustable saddles secured to said beams, substantially as described.

In testimony whereof I affix my signature in presence of two witnesses.

NAPOLEON B. SPRADLEY.

Witnesses:
   THOS. NEELY,
   JOS. P. CALDWELL.